United States Patent [19]

Helm

[11] 3,801,348

[45] Apr. 2, 1974

[54] METHOD OF APPLYING A COATING OF HEAT HARDENABLE THICKENED EPOXY RESIN MASSES

[75] Inventor: Dietrich Helm, Unna, Germany

[73] Assignee: Schering AG, Bergkamen, Germany

[22] Filed: Sept. 21, 1972

[21] Appl. No.: 290,817

Related U.S. Application Data

[62] Division of Ser. No. 150,755, June 7, 1971, abandoned.

[30] Foreign Application Priority Data

June 12, 1970 Germany.............................. 2030054

[52] U.S. Cl.......... 117/21, 117/161 ZB, 260/37 EP, 260/47 EN
[51] Int. Cl............................................. B44d 1/094
[58] Field of Search..... 117/161 ZB, 21; 260/37 EP, 260/47 EN

[56] References Cited
UNITED STATES PATENTS

| | | | |
|---|---|---|---|
| 2,786,794 | 3/1957 | Gams et al....................... | 117/21 X |
| 3,018,258 | 1/1962 | Meier et al................. | 260/47 EN X |
| 3,321,438 | 5/1967 | Brooker et al.............. | 260/37 EP X |
| 3,420,794 | 1/1969 | May et al..................... | 260/37 EP X |
| 3,530,093 | 9/1970 | Maurer ....................... | 260/37 EP X |
| 3,575,926 | 4/1971 | Joyce et al. ..................... | 260/47 EN |
| 3,634,322 | 1/1972 | Ruf et al......................... | 260/47 EN |
| 3,725,502 | 4/1973 | Bernheim et al. .......... | 260/47 EN X |

*Primary Examiner*—William D. Martin
*Assistant Examiner*—Shrive P. Beck
*Attorney, Agent, or Firm*—Curtis, Morris & Safford

[57] ABSTRACT

A method of applying a coating of comminuted particles of a heat hardenable epoxy resin to a surface and then heating said particles at a temperature of 150° to 180° C to produce a hardened resinous coating. The heat-hardenable epoxy resin masses ranging from a soft to a brittle consistency are prepared by thickening, at a temperature from 20° to 120° C., a mixture of (1) a liquid epoxy resin, (2) dicyandiamide, and (3) a tertiary amine accelerator, in the presence of a monoamine or diamine.

1 Claim, No Drawings

METHOD OF APPLYING A COATING OF HEAT HARDENABLE THICKENED EPOXY RESIN MASSES

This is a division of application Ser. No. 150,755, filed Jun. 7, 1971 now U.S. Pat. No. 3,728,302.

The present invention relates to heat-hardenable thickened epoxy resin masses, and to methods of making and hardening the same. The masses may have the form either of soft, tack-free compositions or of brittle, hard substances: both forms are as tack-free as possible storage-stable, and harden when heated to elevated temperatures.

Various methods are already known in the art for the preparation of heat-hardenable epoxy resin masses. In one case, high molecular weight solid epoxy resins are pulverized and ground with a finely-divided hardening agent, with optional addition of fillers, fibers, and the like. Since the epoxy resin and hardener are both present in solid form, such masses are stable on storage but nevertheless can be relatively quickly hardened.

In other processes, the epoxy resin masses are present in the so-called "B stage." To prepare such masses, epoxy resins and amine hardeners are homogeneously dissolved in one another and reacted. However, hardening is only carried out until a thermoplastic condition is achieved. In this condition, further hardening is inhibited by the congealing of the mass, whereby a limited storage stability is achieved.

These resin masses, however, have the disadvantage that they are sensitive to atmospheric humidity and to carbon dioxide because of the presence of free amino groups.

A further method common in the art comprises melting a solid epoxy resin and 1-cyano-guanadine (dicyanamide), in the optional presence of tertiary amines (for example, in the preparation of powdered lacquers), or comprises dissolving these materials in solvents such as ketones. A fibrous network, for example of fiberglass, is then impregnated with the composition and any solvent is subsequently driven off. In this manner, stiff pre-impregnated materials, so-called "prepregs" are obtained.

All of the formulations of epoxy resins discussed above have the disadvantage that the intermediate products or semi-prepared products are always hard and brittle and that, at least in part, their preparation involves a costly route employing solutions of the resin and hardening agent.

In the field of unsaturated polyester resins, so-called "resin mats" are known. These can be further worked on rollers and show other processing advantages. The "resin mat" comprises a glass fiber mat which is impregnated with a filled and catalyzed unsaturated polyester resin. By the use of small amounts of magnesium oxide or similar materials, the polyester resin can be thickened in a period of time ranging from hours to days to a soft, only slightly tacky condition. To prevent possible blocking, the resin mats are interleaved with polyethylene foil inserts.

The results achieved with such "resin mats" in the unsaturated polyester resin field are not, however, satisfactory for all fields of use.

The present invention has as an object the preparation of soft, storage-stable epoxy resin masses, which are as tack-free as possible and which are quickly hardenable on heating. A further object of the invention is to overcome the above-described disadvantages of those epoxy resin masses which are of hard or brittle consistency while avoiding circuitous preparatory methods involving resin solutions or resin melts.

According to the present invention, heat hardenable thickened epoxy resin masses which are stable for several months at room temperature, become pourable on heating, and which can be hardened in a few minutes at temperatures between about 150° and 180° C., suitably while imparting a form thereto, are prepared from mixtures of a liquid epoxy resin comprising an aromatic polyglycidyl ether with finely divided dicyandiamide in combination with a tertiary amine accelerator. The mixtures, which may optionally contain pigments, auxiliaries, fillers and/or strengthening agents, particularly fibers or fiber networks (e.g., woven or non-woven fabrics), are thickened at temperatures of from about 20° C. to about 120° C. by the use of aliphatic and/or araliphatic and/or cycloaliphatic monoamines and/or diamines.

In general, liquid epoxy resins comprising aromatic polyglycidyl ethers are suitable as the principal resin in the epoxy resin masses according to the present invention, particularly liquid diglycidyl ethers of bisphenols such as diphenylol propane (bisphenol A) or diphenylol methane (bisphenol F), or of phenol-aldehyde-condensation products (novolacs). Further suitable materials include those epoxy resins which are prepared from methyl epichlorohydrin instead of epichlorohydrin. Commercially available epoxide resins and epoxy resin formulations exhibit different molecular weights but are, in principle, all suitable for use in the present invention providing they are liquid at room temperature.

In order to achieve low viscosities prior to the thickening of the epoxy resin masses, reactive diluents may optionally be employed. Such diluents include, for example, butyl-, allyl-, phenyl-, and cresyl-glycidyl ethers, diglycidyl ether, butanediol diglycidyl ether, hexahydrophthalic acid diglycidyl ester, and the like. These reactive diluents can influence storage stability as well as the resistance to heat of the products formed therefrom on hardening and are suitably used in amounts less than 25 percent, preferably less than 10 percent, by weight of the total epoxy component.

The liquid resins are combined with from about 0.1 to 0.6 mol of finely divided dicyandiamide, per equivalent of epoxy compound in excess of those epoxy equivalents involved in thickening reactions with the amine thickener discussed more in detail below. By the term "finely divided dicyandiamide", as used herein, is meant that 90 percent or more by weight of the dicyandiamide has a particle size less than about 50 microns, preferably under 30 microns. Hardened bodies having a particularly good resistance to heat are obtained from hardenable resin masses in which the amount of dicyandiamide is about 0.25 mol per equivalent of excess epoxy groups.

A tertiary amine accelerator is employed with the dicyandiamide in an amount of about 0.2 – 2 percent by wieght of the total epoxy compound employed. The choice of amine is not critical to the invention. Of the large number of tertiary amines which are known in the art as accelerators and which can be used in the present invention, the following are a few of the particularly advantageous and most easily accessible materials: triethylamine, tributylamine, N,N'-tetramethylethylene diamine, dimethyl- and diethanol-amine, benzyl dimethylamine, (dimethyl-aminomethyl)-phenol, tris-(dimethylaminomethyl)-phenol, and the like. Those tertiary amines which are latently bound in molecular sieves and which are first freed at elevated temperatures can also be employed. If a tertiary amine also containing primary or secondary amino groups, e.g., N-aminoethyl piperazine, is employed as an accelerator, the amount of amine employed for thickening (discussed immediately below) can be reduced by an amount corresponding with such non-tertiary groups.

The resin/dicyandiamide mixtures are suitably thickened with amines containing primary and/or secondary amino groups in amounts providing from about 0.05 – 0.8 equivalent of amino hydrogen per equivalent of epoxy compound. For thickening, a large number of aliphatic, araliphatic, and cycloaliphatic mono- and diamines can be employed, alone or in combination with each other. In practice, the availability, vapor pressure, odor, sensitivity to $CO_2$, and the toxicity of these amines, as well as their influence on the storage stability of the masses prepared according to the present invention and the resistance to heat of the hardened masses, are of course taken into consideration. From this point of view, primary monoamines such as hexyl- and cyclohexyl-amine, ethanolamine, propanolamine, benzylamine, and the like are particularly advantageous among the monoamines. As diamines, diprimary, disecondary, and/or mixed primary-secondary diamines can all be employed. Trimethylhexamethylene diamine, 3,3'-dimethyl-4,4'-diamino-dicyclohexyl-methane, and particularly 3-(aminomethyl)-3,5,5-trimethyl-1-cyclohexylamine ("isophorone diamine"), for example, are preferred for the above-mentioned grounds and because of their ready availability and cost. Other cycloaliphatic and mixed aliphatic-cycloaliphatic diamines such as N-cyclohexyl-propylene diamine, for example, can also be used. A better resistance to heat is obtained with the two diamines 3,3'-dimethyl-4,4'-diamino-dicyclohexyl-methane and 3-(aminomethyl)-3,5,5-trimethyl-1-cyclohexylamine.

In the preparation of soft, putty-like epoxy resin masses comprising bisphenol glycidyl ethers according to the invention, it can be advantageous to employ cycloaliphatic diamines together with aliphatic, araliphatic, or cycloaliphatic monoamines. In this way, soft masses which exhibit particularly low tack are obtained. A low tack can be achieved particularly by the use or joint use of polygycidyl ethers of novolacs.

On the other hand, aliphatic or cycloaliphatic monoamines can be employed alone for thickening, particularly when polyglycidyl ethers of novolacs are present, without an undesirable decrease in the resistance to heat of the hardened masses.

For thickening epoxy resins comprising diglycidyl compounds, it has been observed that soft epoxy resin masses are obtained by using about 0.1 – 0.3 equivalent of amino hydrogen per equivalent of epoxy compound. At other ratios, the masses are brittle and hard. When novolacs, which contain more than two glycidyl groups in the molecule, are employed as the polyepoxy compound, 0.05 – 0.2 equivalent of amino hydrogen per equivalent of epoxy compound are suitable for the preparation of soft masses, depending on the amine chosen and any monoglycidyl compound which may also be present.

Generally speaking, the amounts of amine to be used to obtain soft products are more apt to fall within the above-discussed equivalence ratios when monoamines are used than when diamines are employed. Diprimary diamines having four amino hydrogen atoms per molecule can generally be used in amounts of at most about 0.4 equivalent of amino hydrogen per equivalent of epoxy compound, whether used alone or with other amines, without loss of thermoplasticity.

The heat-hardenable epoxy resin masses according to the present invention can be employed without further additives, for example as adhesives, coating agents, forming bodies, and the like. On the other hand, when used as molding compounds or for injection molding, they may contain conventional fillers and/or fibrous reinforcements together with optional pigments and other auxiliaries such as lubricants. The brittle and hard resin masses of the invention can, after grinding and with the optional addition of pigments and auxiliaries, be employed as powdered lacquers.

In the following Examples, given by way of illustration, the use of fibrous reinforcements has not been illustrated in order better to show the intrinsic properties of the resin masses.

EXAMPLE 1

200 grams of diphenylol propane diglycidyl ether (epoxy equivalent weight = 190) are stirred with 18 g of dicyandiamide (95 percent under 30 microns) and 228 g of finely-divided chalk (calcium carbonate). 4.4 g of isophorone-diamine, 5.6 grams of benzylamine, and 1 gram of benzyl dimethylamine as an accelerator are stirred in and the mass is homogenized on a three-roll mill. The mass is poured out into a flat mold and left to stand for 2 days to thicken at room temperature. Thereafter, it has the consistency of an only slightly tacky putty. In this putty-like thickened condition, the epoxy resin mass of the present invention remains practically unchanged after more than four weeks storage at room temperature.

The filled mass is hardened by compressing for 5 minutes at 170° C. to form 4 mm thick plates. These show a resistance to deformation by heat according to Martens of 170° C., a bending resistance of 1,150 kilopounds/cm² (kp/cm²), and an impact resistance of 8 cm.kp/cm².

If glass fiber mats are impregnated with the liquid mass prior to thickening, and the impregnated mats are rolled up between polyethylene films and left to thicken, the epoxy resin mats can be unrolled after 2 or more days and can then be formed by pressing after removal of the polyethylene.

EXAMPLE 2

190 g of diphenylol propane diglycidyl ether (epoxy equivalent weight = 190), 10 g of butyl glycidyl ether, 0.8 g of tris-(dimethylaminomethyl)-phenol as accelerator, and 13.4 g of finely-divided dicyandiamide are stirred and homogenized on a three-roll mill. Subsequently 17.6 g of isophorone diamine are stirred in well and the mass is stored in flat molds for 2 days at room temperature. After this time, it is thickened to a thermoplastic condition. The epoxy resin mass remains stable at room temperature storage for more than 4 weeks: that is, it will melt on heating.

The unfilled epoxy resin mass prepared as described above is formed into 4 mm thick plates under pressure for 5 minutes at 170° C. These plates show a resistance to deformation to heat according to Martens of 108° C., have a bending resistance of 1,620 kp/cm², and an impact resistance of 17 cm.kp/cm².

Alternatively, the mass can be finely ground and applied to metal, for example by electrostatic spraying. After hardening of the coating in an oven at 170° – 180° C., a tough hard and glossy coating is obtained.

EXAMPLE 3

180 g of a glycidyl ether formed from a phenol-formaldehyde-condensate having an epoxy value of 0.572 (commercially available under the tradename "Epikote 154") are mixed at about 40°C. with 20 g of phenyl glycidyl ether. The mixture is stirred with 10.4 g of benzylamine, 20 g of finely divided dicyandiamide, 0.8 g of benzyl dimethylamine, and 230 g of finely divided chalk, and homogenized on a three-roll mill. The mass is permitted to thicken for 2 days at room temperature in flat molds. Thereafter, it has a putty-like consistency which remains for several weeks at 20° C.

The thickened mass was formed into 4 mm thick plates by heating under pressure for 10 minutes at 170° C. These plates show a resistance to deformation by heat according to Martens of 105° C., a bending resistance of 1,000 kp/cm², and an impact resistance of 5 cm.kp/cm².

EXAMPLE 4

The procedure of Example 3 is followed, except that 7.3 g of isophorone diamine are employed instead of the benzylamine.

After 5 minutes forming under pressure at 175° C., plates are obtained having a resistance to deformation by heat according to Martens of 120° C., a bending resistance of 1,030 kp/cm² and an impact resistance of 5 cm.kp/cm².

EXAMPLE 5

400 g of diphenyl propane diglycidyl ether (epoxy equivalent weight = 190), 18 g of finely divided dicyandiamide, and 190 g of titanium dioxide pigment are stirred together with a mixture of 17.6 g of isophorone diamine, 41.3 g of cyclohexylamine, 1.6 g of benzyldimethylamine, and 4.8 g of a flow-promoting agent comprising an acrylate resin. Subsequently, the mixture is homogenized on a three-roll mill. The mass is poured into a flat pan, 4 cm high and lined with polyethylene film, wherein it thickens overnight with slight exothermicity. After 3 days, the hard block is separated from the film and at first coarsely ground and subsequently finely ground in an impact mill with the addition of 6.5 grams of amorphous finely divided SiO₂ ("Aerosil"). The powdered lacquer prepared in this manner is stable at room temperature for months. The material can be applied with an electrostatic spray gun, for example. After heating for 10 – 20 minutes at about 180° C., a hard, glossy, good-flowing coating is obtained.

EXAMPLE 6

98 g of diphenylpropane diglycidyl ether (epoxy equivalent weight = 190) and 4.55 g of finely-divided dicyandiamide are mixed and homogenized on a three-roll mill. A mixture of 2.2 g of isophorone diamine, 12.9 g of cyclohexyl amine, and 0.4 g of benzyl dimethylamine are then stirred in. A thin non-woven fabric of glass fibers is then saturated with the liquid mass and any excess is squeezed off under slight pressure. The saturated fabric is heated for 6 minutes at 110° – 120° C. to thicken the resin. After cooling, a stiff adhesive film, stable for several months at 20° C., was obtained in this manner.

When a steel laminate is prepared with this adhesive film according to the procedures in DIN 53282 or 53283, in which hardening is carried out for example for 120 minutes at 140° C. or for 20 minutes at 180° C., the resulting laminate shows a shear resistance of 3.8 kp/mm and a peel strength of 12 kp/cm.

EXAMPLE 7

Example 1 is repeated with the difference that 6.6 grams of 3,3'-dimethyl-4,4'-diamino-dicyclohexyl-methane are employed instead of isophorone diamine. The results are practically the same as those in Example 1.

EXAMPLE 8

200 grams of diphenylol propanediol glycidyl ether (epoxy equivalent weight = 190) are stirred together with 11.4 g of finely divided dicyandiamide, 8.4 g of an isomeric mixture of 2,2,4- and 2,4,4-trimethyl-hexamethylene-diamine, 15.6 g of cyclohexylamine, 0.8 g of benzyldimethylamine, and 492 g of finely divided chalk. The mixture is homogenized on a three-roll mill.

Subsequently, the mass is stored for 2 days at room temperature. The hard and brittle mass is then formed into plates 4 mm in thickness under pressure at 170° C. over a period of 10 minutes. These show a resistance to deformation by heat, measured by the method of Martens, of 94° C., a resistance to bending of 900 kp/cm², and an impact resistance of 5 cm.kp/cm².

What is claimed is:

1. A method of coating a surface comprising preparing a hardenable epoxy resin composition by thickening at a temperature between about 20° C. and about 120° C. and in the presence of at least one aliphatic, araliphatic, or cycloaliphatic monoamine or diamine, a mixture of:
    a. a liquid epoxy resin comprising an aromatic polyglycidyl ether;
    b. finely-divided dicyandiamide; and
    c. a tertiary amine accelerator, said monoamine or diamine being present in an amount providing from about 0.05 to about 0.8 equivalent of amino hydrogen per equivalent of epoxy compound, said dicyandiamide being present in an amount of from about 0.1 mol to about 0.6 mol per equivalent of epoxy compound in excess of that reacting with said monoamine or diamine, and said tertiary amine being present in an amount from about 0.2 to about 2 percent by weight of said epoxy resin, and then comminuting said mass into particles, applying said particles to said surface, and heating said particles at a temperature between about 150° and 180° C. to produce a hardened resinous coating on said surface.

* * * * *

UNITED STATES PATENT OFFICE
CERTIFICATE OF CORRECTION

Patent No. 3,801,348                    Dated April 2, 1974

Inventor(s) Dietrich Helm

It is certified that error appears in the above-identified patent and that said Letters Patent are hereby corrected as shown below:

In the Heading, Item "[73]":

After "Schering AG," insert -- Berlin and --.

Signed and sealed this 17th day of September 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,801,348　　　　　　　　Dated April 2, 1974

Inventor(s) Dietrich Helm

It is certified that error appears in the above-identified patent and that said Letters Patent are hereby corrected as shown below:

In the Heading, Item "[62]":

replace "abandoned" by -- now U.S. Patent 3,728,302 granted April 17, 1973 --.

Signed and sealed this 4th day of February 1975.

(SEAL)
Attest:

McCOY M. GIBSON JR.　　　　　　　C. MARSHALL DANN
Attesting Officer　　　　　　　　Commissioner of Patents